US012536670B1

(12) United States Patent
Sanganeria et al.

(10) Patent No.: US 12,536,670 B1
(45) Date of Patent: Jan. 27, 2026

(54) SYNCHRONIZING VIDEO TO AUDIO USING VISUAL BEATS

(71) Applicant: Meta Platforms, Inc., Menlo Park, CA (US)

(72) Inventors: Mayank Sanganeria, Brooklyn, NY (US); Maneesh Agrawala, Stanford, CA (US); Andrew Stewart Denyes, Seattle, WA (US); Andrei Viktorovich Chtcherbatchenko, Redmond, WA (US); Michael Fredrick Cohen, Seattle, WA (US); Tarek Hefny, Redmond, WA (US); Jacob Herbel, Shoreline, WA (US); Sung Kyu Robin Kim, Pleasanton, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 274 days.

(21) Appl. No.: 18/306,913

(22) Filed: Apr. 25, 2023

Related U.S. Application Data

(60) Provisional application No. 63/421,485, filed on Nov. 1, 2022, provisional application No. 63/421,482, filed on Nov. 1, 2022, provisional application No. 63/414,833, filed on Oct. 10, 2022, provisional application No. 63/409,943, filed on Sep. 26, 2022.

(51) Int. Cl.
*G06T 7/246* (2017.01)
*G11B 27/34* (2006.01)

(52) U.S. Cl.
CPC ............. *G06T 7/246* (2017.01); *G11B 27/34* (2013.01); *G06T 2207/10016* (2013.01); *G06T 2207/30196* (2013.01)

(58) Field of Classification Search
CPC .......... G06T 7/246; G06T 2207/10016; G06T 2207/30196; G11B 27/34
See application file for complete search history.

(56) References Cited

U.S. PATENT DOCUMENTS

| 6,686,970 | B1 | 2/2004 | Windle |
| 2010/0223128 | A1 | 9/2010 | Dukellis et al. |
| 2011/0213614 | A1 | 9/2011 | Lu et al. |
| 2011/0259179 | A1 | 10/2011 | Oertl et al. |
| 2012/0188411 | A1 | 7/2012 | Jang |

(Continued)

FOREIGN PATENT DOCUMENTS

WO   WO-2019241785 A1 * 12/2019

OTHER PUBLICATIONS

Davis, Abe, and Maneesh Agrawala. "Visual rhythm and beat." ACM Transactions on Graphics (TOG) 37, No. 4 (2018): 1-11. (Year: 2018).*

*Primary Examiner* — Wassim Mahrouka
(74) *Attorney, Agent, or Firm* — EVERSHEDS SUTHERLAND (US) LLP

(57) ABSTRACT

Methods, systems, and storage media for generating visual beats are disclosed. Exemplary implementations may: receive an input video; identify one or more objects in motion within the sequence of a plurality of video images; weight an impact envelope with a change in angle for each of the one or more objects in motion in the sequence of a plurality of video images; generate a directogram based on the impact envelope; and identify moments corresponding to one or more visual beats in the sequence of a plurality of video images for emphasis based on the directogram.

20 Claims, 7 Drawing Sheets

(56) References Cited

U.S. PATENT DOCUMENTS

| | | |
|---|---|---|
| 2014/0123836 A1 | 5/2014 | Vorobyev et al. |
| 2015/0243324 A1 | 8/2015 | Sandrew et al. |
| 2016/0139871 A1 | 5/2016 | Farshi et al. |
| 2018/0077362 A1 | 3/2018 | Prasad et al. |
| 2018/0286458 A1 | 10/2018 | Harron et al. |
| 2020/0304755 A1 | 9/2020 | Narayan et al. |
| 2022/0343923 A1 | 10/2022 | Todorov et al. |
| 2022/0392461 A1 | 12/2022 | Giron et al. |
| 2023/0005201 A1* | 1/2023 | Wu .......................... G10H 1/40 |
| 2024/0242736 A1* | 7/2024 | Rashid ................. G11B 27/031 |

* cited by examiner

SYNCHRONIZING VIDEO TO AUDIO USING VISUAL BEATS

CROSS REFERENCE TO RELATED APPLICATIONS

This application claims priority under 35 U.S.C. § 119 (e) to U.S. Patent Application No. 63/409,943 filed Sep. 26, 2022, U.S. Patent Application No. 63/414,833 filed Oct. 10, 2022, U.S. Patent Application No. 63/421,482 filed Nov. 1, 2022, and U.S. Patent Application No. 63/421,485 filed Nov. 1, 2022, the disclosures of which applications are incorporated by reference herein, in their entirety, for all purposes.

TECHNICAL FIELD

The present disclosure generally relates to generating visual beats, and more particularly to synchronizing video to audio using visual beats.

BACKGROUND

User-created video content is shared on social media as a routine form of communication between users. User-created video content typically is not elaborately processed to present material and specific moments within the video that are presented in a manner that emphasizes these moments from within the entire sequence of video images. Identifying the moments that require added emphasis to enhance the presentation of the content within the video images can be time consuming and can require significant effort and processing skills that may be beyond the abilities of a typical social media user. As such, a need exists to provide an automated tool to identify the specific moments within the video that may be emphasized to enhance the presentation of the video content. This automated tool may also include a plurality of enhancement mechanisms that may be applied to the identified moments to visually add emphasis to the point in time within the sequence of video images that distinguishes these visual moments from the remaining portions of the video.

BRIEF SUMMARY

The subject disclosure provides for systems and methods for generating visual beats. User-generated video content corresponds to video data typically captured by users of mobile devices such as smartphones having integrated camera devices. This video data is generally shared with other individuals using electronic communications, file sharing, and social media platforms. Much of this user-generated video content may benefit from visual enhancements made to the video data that can be both difficult and time consuming to perform. This video content may be automatically enhanced by identifying points in time within the video data that represent a significant movement, sometimes referred to as a visual beat, by the subject of the video images and applying visual enhancements to the video images containing one or more visual beats. While methods for identifying visual beats may exist, these methods do not automatically produce adequate results in identifying occurrence of the visual beats. Improvement to the identification and then subsequent utilization of the visual beats is disclosed herein.

One aspect of the present disclosure relates to a method for generating visual beats. The method may include receiving an input video. The input video may include a sequence of a plurality of video images. The method may include identifying one or more objects in motion within the sequence of a plurality of video images, the one or more objects corresponding to one or more points of interest within the sequence of a plurality of video images. The method may include weighting an impact envelope with a change in angle for each of the one or more objects in motion in the sequence of a plurality of video images. The method may include generating a directogram based on the impact envelope. The method may include identifying moments corresponding to one or more visual beats in the sequence of a plurality of video images for emphasis based on the directogram.

Another aspect of the present disclosure relates to a system configured for generating visual beats. The system may include one or more hardware processors configured by machine-readable instructions. The processor(s) may be configured to receive an input video. The input video may include a sequence of a plurality of video images, and the input video is uploaded from one or more of user-generated video sources. The processor(s) may be configured to identify one or more objects in motion within the sequence of a plurality of video images, the one or more objects corresponding to one or more points of interest within the sequence of a plurality of video images. The processor(s) may be configured to weight an impact envelope with a change in angle for each of the one or more objects in motion in the sequence of a plurality of video images. The processor(s) may be configured to generate a directogram based on the impact envelope. The processor(s) may be configured to identify moments corresponding to one or more visual beats in the sequence of a plurality of video images for emphasis based on the directogram.

Yet another aspect of the present disclosure relates to a non-transient computer-readable storage medium having instructions embodied thereon, the instructions being executable by one or more processors to perform a method for generating visual beats. The method may include receiving an input video. The input video may include a sequence of a plurality of video images. The method may include identifying one or more objects in motion within the sequence of a plurality of video images. The one or more objects corresponding to one or more points of interest within the sequence of a plurality of video images and the sequence of the plurality of video images comprises visual motion of the subject moving within the sequence of video images. The method may include weighting an impact envelope with a change in angle for each of the one or more objects in motion in the sequence of a plurality of video images. The method may include generating a directogram based on the impact envelope. The method may include identifying moments corresponding to one or more visual beats in the sequence of a plurality of video images for emphasis based on the directogram.

Still another aspect of the present disclosure relates to a system configured for generating visual beats. The system may include means for receiving an input video. The input video may include a sequence of a plurality of video images. The system may include means for identifying one or more objects in motion within the sequence of a plurality of video images, the one or more objects corresponding to one or more points of interest within the sequence of a plurality of video images. The system may include means for weighting an impact envelope with a change in angle for each of the one or more objects in motion in the sequence of a plurality of video images. The system may include means for generating a directogram based on the impact envelope. The system may include means for identifying moments corresponding to one or more visual beats in the sequence of a plurality of video images for emphasis based on the directogram.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
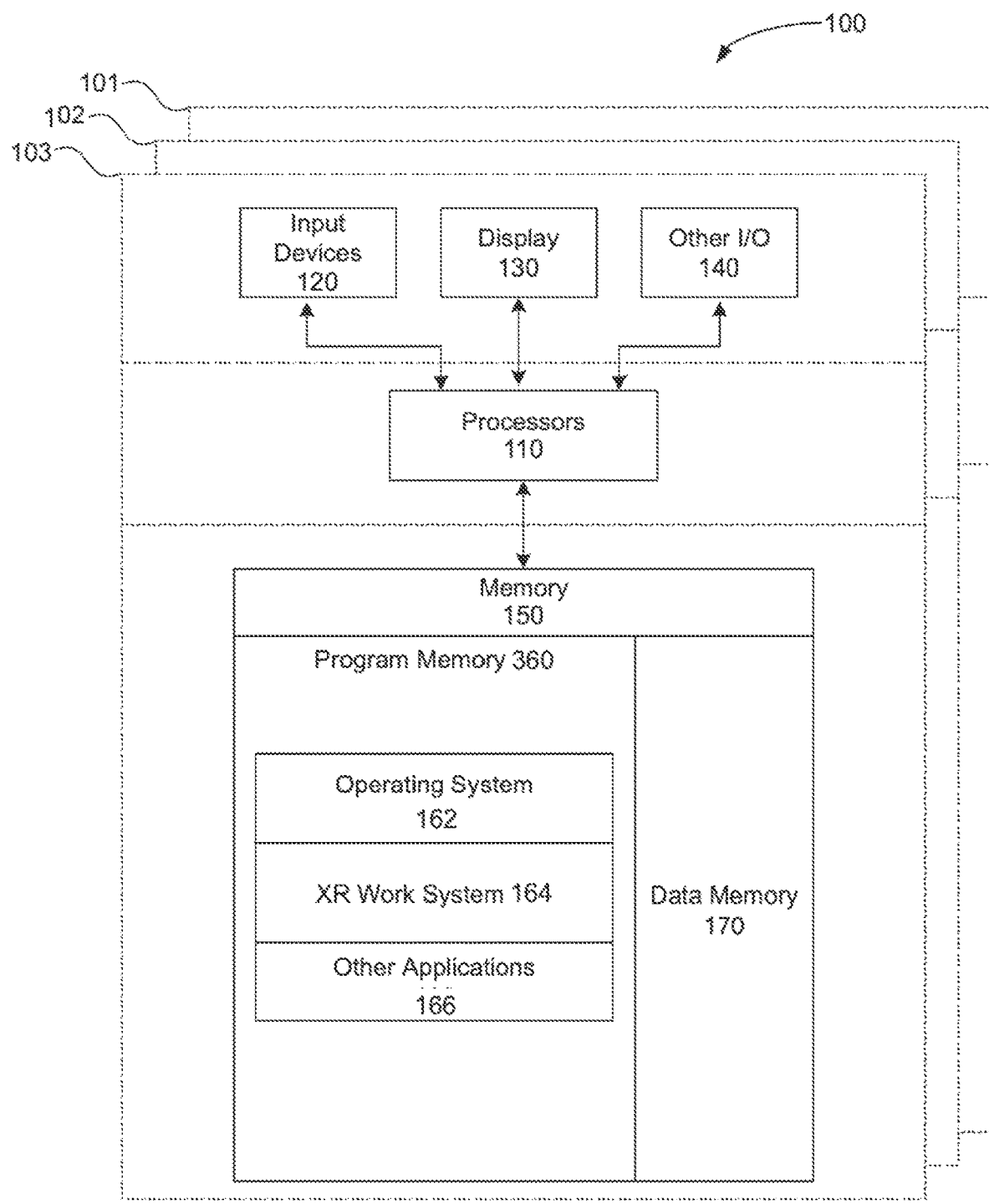
FIG. 1 is a block diagram illustrating an overview of devices with which some implementations of the disclosed technology can operate.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Social media users want to create compelling video content, without having to put in significant amounts of time to shoot and edit videos. Synchronizing their videos to audio, and otherwise emphasizing important points in time in an input video is a high-impact way to do so. Giving users an ability to create videos without having to spend a lot of time and energy enables the creation of content to share. Existing approaches to identify important points in time, known as visual beats, within input videos do not readily distinguish between ordinary movement and important motions corresponding to points of emphasis.

The subject disclosure provides for systems and methods for generating visual beats. User-created video content is shared on social media as a routine form of communication between users. User-created video content typically is not elaborately processed to present material and specific moments within the video that are presented in a manner that emphasizes these moments from within the entire sequence of video images. Identifying the moments that require added emphasis to enhance the presentation of the content within the video images can be time consuming that requires significant effort and processing skills that may be beyond the abilities of a typical social media user. As such, a need exists to provide an automated tool to identify the specific moments within the video that may be emphasized to enhance the presentation of the video content. This automated tool may also include a plurality of enhancement mechanisms that may be applied to the identified moments to visually add emphasis to the point in time within the sequence of video images that distinguishes these visual moments from the remaining portions of the video.

Implementations described herein address the aforementioned shortcomings and other shortcomings by providing a system and method for automatically analyzing object motion by determining movement between subsequent images from a video by identifying objects and body parts of individuals captured in a video sequence of significance and determining the movement of these identified items from one-pixel location to another in subsequent video frames. The identification of visual beats is subsequently identified from the detected motion of the identified items by identifying detected motion having peak values of angular change when compared from frame to frame in the input video. Once the points in time in which visual beats are identified may be utilized to generate an output video providing visual emphasis of video frames corresponding to the visual beats from among all frames in the input video.

Identification of visual beats from user-created video content allows for use of the visual beats to identify points in time within the user-created video content that may benefit from the addition of visual emphasis to video image frames associated with the visual beats. The addition of visual emphasis to video image frames may include altering pixel values within the video image frames to visually identify an occurrence of the visual beat. The addition of visual emphasis to video image frames also may include displaying the video image frames associated with the occurrence of the visual beat for a longer period of time when compared to other video image frames within the user-created video content. Many other mechanisms may be used to visually identify the occurrence of the visual beats when the user-created video content is output for viewing.

FIG. 1 is a block diagram 100 illustrating an overview of devices with which some implementations of the disclosed technology can operate. The devices can comprise hardware components of a computing system 100 that can create, administer, and provide interaction modes for an artificial reality collaborative working environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer-created or augmented experience for a user without the need for external processing or sensors. In other implementations, computing system 100 can include multiple computing devices such as mobile devices (such as smartphones and tablets) and a core processing component (such as a console, mobile device, or server system) where some processing operations are performed on the headset and others are offloaded to the core processing component. Example processing systems are described below in relation to FIG. 5. In some implementations, position and environment data can be gathered only by sensors incorporated in the mobile device, while in other implementations one or more of the alternate computing devices can include sensor components that can track environment or position data.

Computing system 100 can include one or more processor(s) 110 (e.g., central processing units (CPUs), graphical processing units (GPUs), holographic processing units (HPUs), etc.). Processor(s) 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processor 110 can have access to a memory 150, which can be contained on one of the computing devices of computing system 100 or can be distributed across one of the multiple computing devices of computing system 100 or other external devices. A memory includes one or more hardware devices for volatile or non-volatile storage and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 360 that stores programs and software, such as an operating system 162, XR work system 164, and other application programs 166. Memory 150 can also include data memory 170 that can include information to be provided to the program memory 360 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
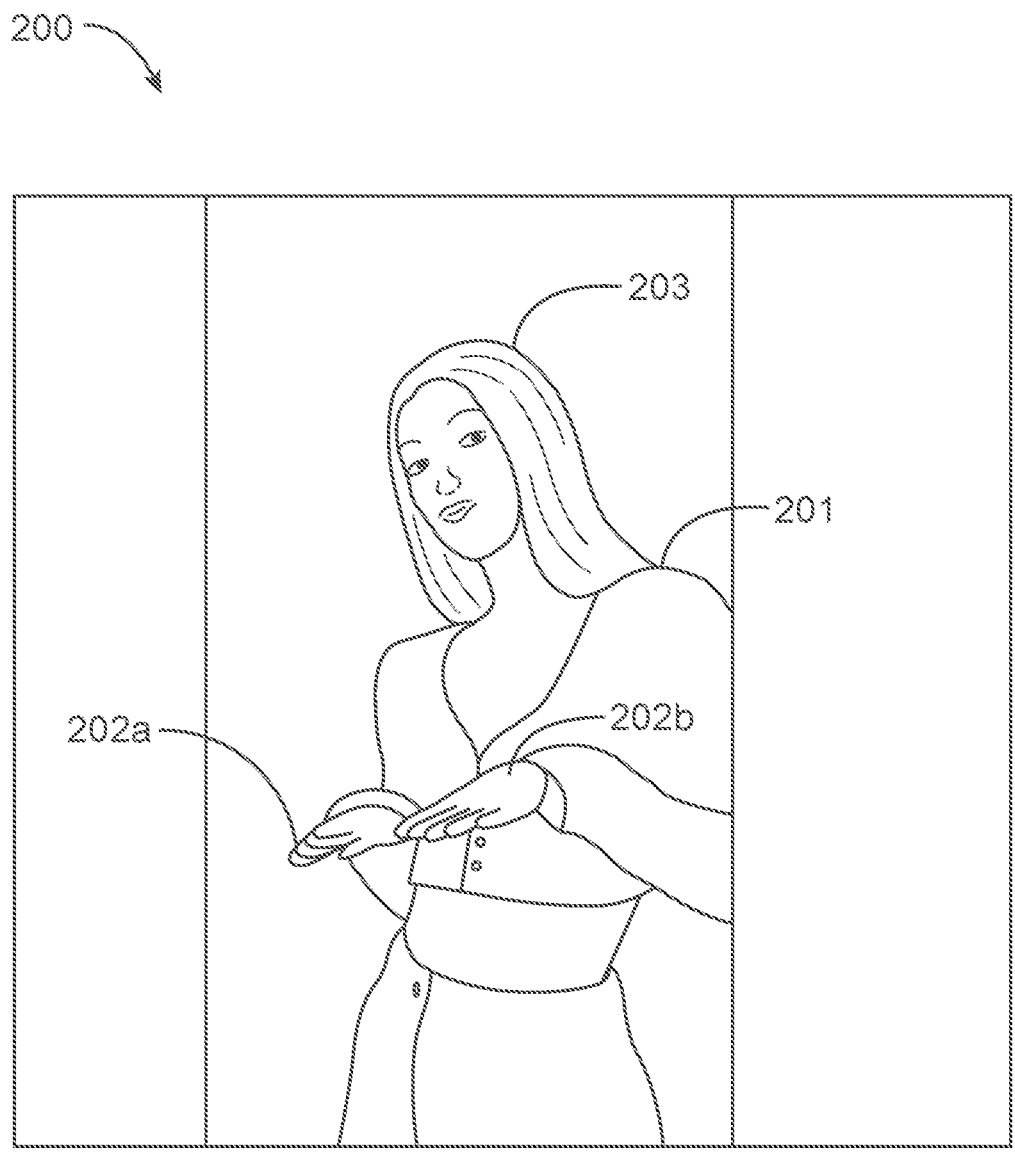
FIG. 2 is an exemplary video frame image of a moving object generating visual beats corresponding to significant detected motion, in accordance with one or more implementations.

FIG. 2 is an exemplary video frame image 200 of a moving object generating visual beats corresponding to significant detected motion, in accordance with one or more implementations. FIG. 2 shows a video frame image 200 having a woman 201 dancing. Various parts of the woman 201 are visible within the video frame image 200 including her hands 202a-b and her head 203. The video frame image 200 is one of a plurality of video frame images that are obtained and played as a sequence of video frame images that make up the user-created video content captured by a user.

The woman 201 is considered to be a subject of the video frame image 200 and various body parts, including the hands 202 and head 203, and are considered to be points of interest associated with the subject of the video frame images 200. Within the sequence of video frame images, these points of interest move from one pixel location of the video image frame 200 to another pixel location corresponding to the movement of the points of interest when the user-created video content is captured. The points of interest may include any number of identifiable locations on the subject that may be detected as it moves with the individual video image frames 200 as the sequence of video image frames is processed.

A visual beat may be identified by determining when one or more of these points of interest moves in a defined manner. When the woman 201 is dancing, the movement of various body parts may be identified when, for example, the hands 202a-b change direction which may be considered to be a significant moment, which may be identified as a visual beat. When dancing, the movement of a woman's hands 202a-b typically occurs in a rhythmic pattern related in time to music which may also be playing at that particular moment. The visual beats may be automatically identified by calculating the movement of the points of interest between subsequent video image frames within the sequence of video image frames of the user-created video content. The movement of the positions of interest may be determined in multiple spatial dimensions and the rate of change in direction of the points of interest may be determined as a measure of the velocity of the points of interest between subsequent video image frames within the user-created video content.

Figure 3:
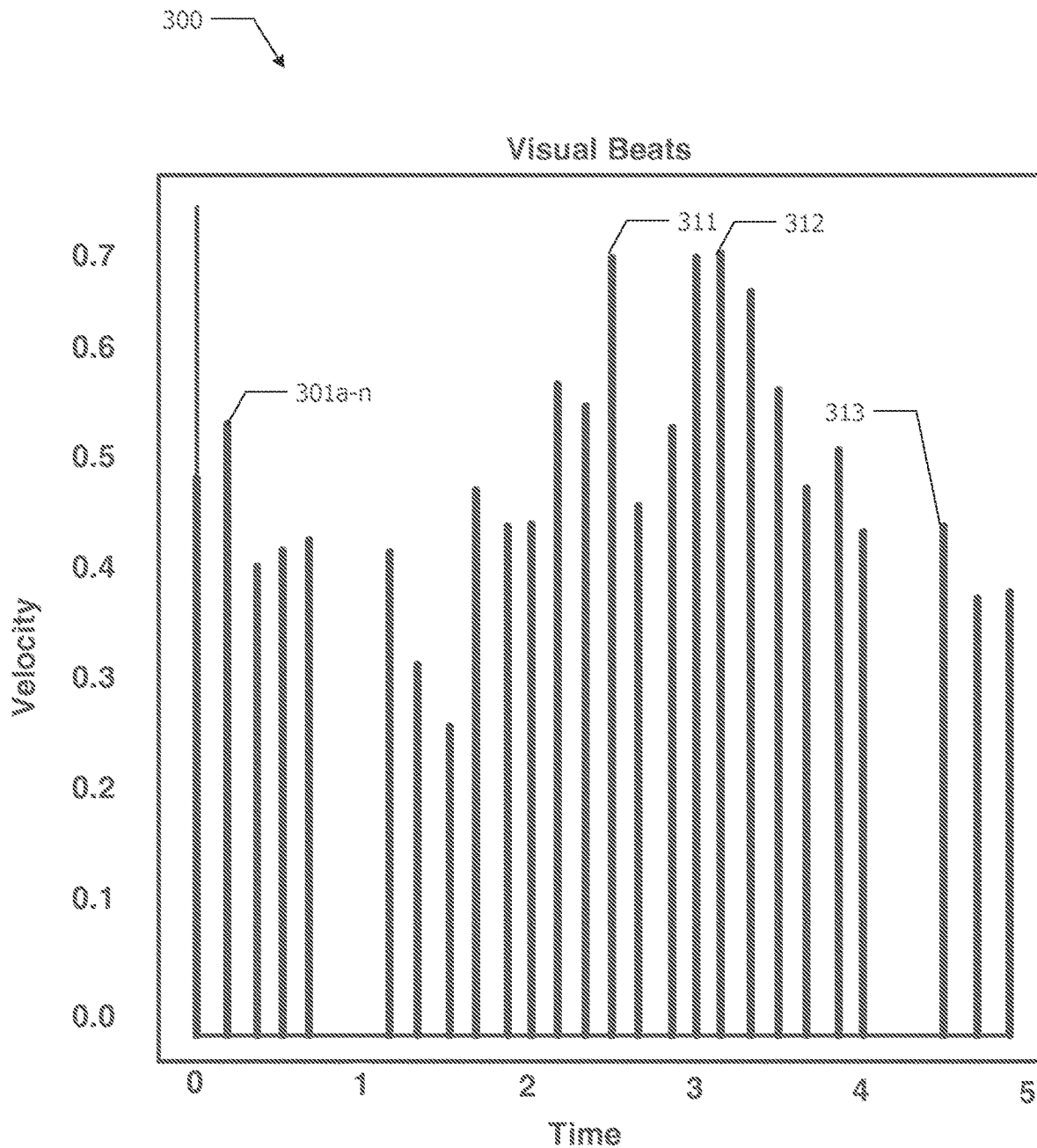
FIG. 3 is an example graphical representation of visual beat signals generated from an exemplary video frame image of a moving object, in accordance with one or more implementations.

FIG. 3 is an example graphical representation 300 of visual beat signals generated from an exemplary video frame image of a moving object, in accordance with one or more implementations. Considering the motion of a single point of interest, for example, one of the hands 202a-b within the video image frame 200, a velocity associated with the movement of the particular point of interest may be calculated between each of the subsequent video image frames 200 within the sequence of video image frames of the user-created video content. FIG. 3 shows calculations for the velocity 301a-n of the point of interest between each of the subsequent pairs of video image frames throughout the user-created video content.

As the point of interest moves, the calculated velocity associated with the point of interest peaks when the point of interest is changing direction the most. This peak in velocity corresponds to a visual beat. By calculating the velocity of the movement of each point of interest as shown in FIG. 3, peaks of velocity 311-313 may be identified. Each of these peak velocities 311-313 are associated with one of the video image frames 200 in the user-created video content. By identifying the peak of velocity 311-313, the corresponding video image frames may be identified as containing a visual beat. Visual enhancement of these video image frames may occur as disclosed below.

Figure 4:
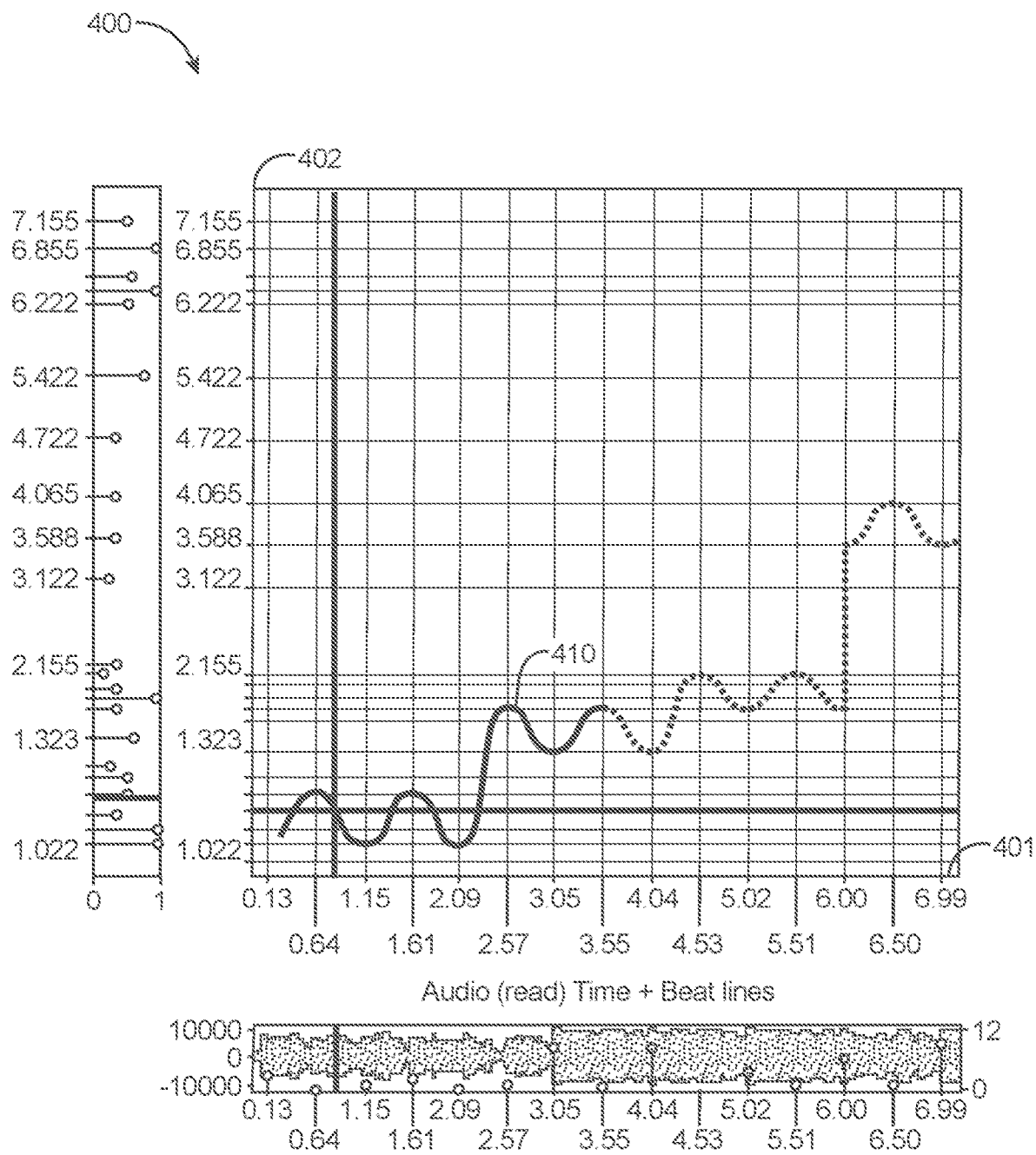
FIG. 4 is an example graphical representation of video frame re-timing useful in emphasizing visual beats identified within an input video, in accordance with one or more implementations.

FIG. 4 is an example graphical representation 400 of video frame re-timing useful in emphasizing visual beats identified within an input video, in accordance with one or more implementations. FIG. 4 shows video frame re-timing 410 for video frames within the user-created video content that have the video image frames associated with one or more visual beats used to change the length of time a video image frame having a visual beat is output in an enhanced version of the user-created video content. This frame re-timing 410 is one of a plurality of visual enhancements that may be made when a visual beat is identified within a particular video image frame 200 (e.g., x-axis 401 is time, and y-axis 402 is velocity).

The disclosed system(s) address a problem in traditional visual beat generation techniques tied to computer technology, namely, the technical problem of automatically identifying a visual beat from within user-created video content and then using the occurrence of the visual beat to add visual emphasis to video image frames corresponding to the occurrence of the visual beat. The disclosed system solves this technical problem by providing a solution also rooted in computer technology, namely, by providing for synchronizing video to audio using visual beats. The disclosed subject technology further provides improvements to the functioning of the computer itself because it improves processing and efficiency in generating visual beats.

Figure 5:
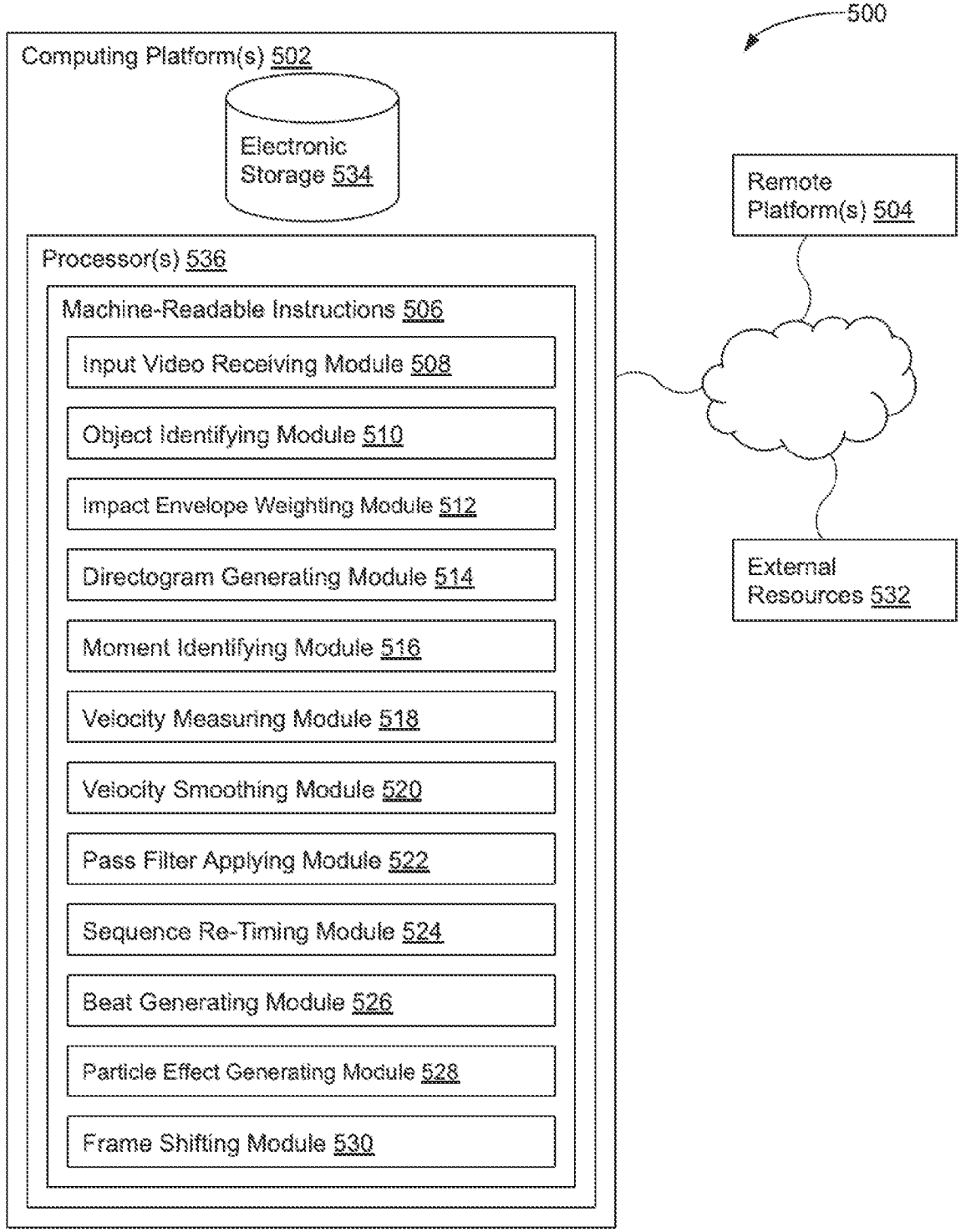
FIG. 5 illustrates a system configured for generating visual beats, in accordance with one or more implementations.

FIG. 5 illustrates a system 500 configured for generating visual beats, according to certain aspects of the disclosure. In some implementations, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of input video receiving module 508, object identifying module 510, impact envelope weighting module 512, directogram generating module 514, moment identifying module 516, velocity measuring module 518, velocity smoothing module 520, pass filter applying module 522, sequence re-timing module 524, beat generating module 526, particle effect generating module 528, frameshifting module 530, and/or other instruction modules.

Input video receiving module 508 may be configured to receive an input video. The input video may be received from one or more of user-generated video sources. The input video may be a user-generated video sequence of video image frames captured using a user mobile device such as a smartphone. The input video may be captured using a plurality of computing devices of a user that is stored as a video data file.

The input video may be received by uploading the input video from a user device. The input video may include a sequence of a plurality of video images. The captured video data file comprises a sequence of video image frames obtained at a fixed frame rate that may be viewed as video data.

Re-timing the sequence based on the directogram may include retiming the sequence of video images using visual beats identified in the input video. As noted above, a visual beat corresponds to an observed motion of one or more points of interest of a subject contained within the sequence of video image frames of the user-generated video content. The directogram is a 2-dimensional matrix to factor motion of points of interest into different angles of changing motion. The directogram corresponds to a spectrogram that factors into its data representation motion in different angles of the points of interest that generate visual beats.

Object-identifying module 510 may be configured to identify one or more objects in motion within the sequence of a plurality of video images. The one or more objects may include one or more individuals showing one or more moving body parts, or other identifiable points of interest that may be seen within one or more of the video image frames. A given visual beat may include a point of interest associated with a subject of a sequence of a plurality of video images having a peak value, as shown above in reference to FIG. 3, for measured changes in the velocity of motion for the one or more objects. The velocity of motion of one or more points of interest may be calculated by determining changes in pixel location of each point of interest between subsequent video image frames captured at a fixed frame rate. This velocity value may be calculated for each pair of subsequent video image frames within the user-generated video content with peak values of the velocity values considered to correspond to a visual beat.

A given visual beat may include identifying points of interest associated with a subject of a sequence of a plurality of video images having a peak value for measured changes in the velocity of motion for the one or more objects, the one or more objects corresponding to one or more points of interest within the sequence of a plurality of video images.

The sequence of the plurality of video images may include visual motion of the subject moving within the sequence of video images. The user-generated video content typically shows a subject, for example a person, moving with the video image frames as discussed above.

Impact envelope weighting module 512 may be configured to weight an impact envelope with a change in angle for each of the one or more objects in motion in the sequence of a plurality of video images. The impact envelope may include an approximate measure of a detected occurrence of a visual beat within the sequence of a plurality of video images. The change in angle may include measurement of changes in movement of points of interest.

Directogram generating module 514 may be configured to generate a directogram based on the impact envelope. The directogram may include a 2-dimensional matrix to factor motion of points of interest into different angles of changing motion. The directogram being based on the impact envelope may include conveying one or both of a visual representation and/or a numerical representation of the impact envelope through the directogram. The plurality of video images being identified for adding visual emphasis based on the directogram including one or more video images having an identified visual beat.

Moment identifying module 516 may be configured to identify moments corresponding to one or more visual beats in the sequence of a plurality of video images for emphasis based on the directogram. The moments correspond to a moment in time associated with a video image frame and may include visual beats detected within sequence of a plurality of video images. The moments may include one or more of points of interest on a subject within a sequence of a plurality of video images having a peak value for measured changes in velocity of motion for the one or more objects. The one or more visual beats may include one or more of points of interest associated with a subject of a sequence of a plurality of video images having a peak value for measured changes in velocity of motion for the one or more objects.

Velocity measuring module 518 may be configured to measure a velocity of an angular bin for each frame in the sequence of a plurality of video images. Measuring the velocity may include measuring a change in location within one or more subsequent video images for a point of interest associated with a subject of the one or more subsequent video images. The angular bin may include a predetermined range of angles of changing motion. The velocity of the angular bin may include a predetermined velocity or range of velocities associated with a predetermined range of angles of changing motion. The velocity measuring module can determine a direction flux in a directogram that comprises the grouping of a velocity or range of velocities and the associated predetermined range of angles of changing motion. Smoothing the velocity in space may include applying a low-pass filter to measured velocity of points of interest associated with a subject of the one or more subsequent video images.

Smoothing the velocity in time may include applying a low-pass filter to measured velocity of points of interest associated with a subject of the one or more subsequent video images.

Velocity smoothing module 520 may be configured to smooth the velocity in both space and time.

Pass filter applying module 522 may be configured to apply a low-pass filter to the sequence of a plurality of video images. The low-pass filter may include a filter configured to pass signals with a frequency lower than a predetermined cutoff frequency and attenuates signals with frequencies higher than the predetermined cutoff frequency.

Sequence re-timing module 524 may be configured to re-time the sequence of a plurality of video images based on the directogram.

Beat generating module 526 may be configured to generate visual beats in the sequence of a plurality of video images based on the directogram. Generating the visual beats based on the directogram may include one or more of identifying points of interest associated with a subject of a sequence of a plurality of video images having a peak value for measured changes in velocity of motion using the directogram for the one or more objects.

Particle effect generating module 528 may be configured to generate effects including a particle effect, a radiance, a doodle, a kaleidoscope, and visual representations of object emphasis. The particle effect may include altering pixel values about a point of interest associated with a subject of a sequence of a plurality of video images. The radiance may include altering pixel radiance values about a point of interest associated with a subject of a sequence of a plurality of video images. The doodle may include a simulation of a hand drawn design. The kaleidoscope may include a symmetrical pattern resulting from simulated repeated reflections.

The visual representations of object emphasis may include altering pixel values about a point of interest associated with a subject of a sequence of a plurality of video images. Generating the effects may include identifying particular pixel locations about a point of interest associated with a subject of a sequence of a plurality of video images having a visual beat for altering pixel values to provide visual emphasis of the visual beat.

Frame shifting module 530 may be configured to shift a frame of the sequence of a plurality of video images. The impact envelope with the change in angle for each of the one or more objects in motion in the sequence of the plurality of video images may include measurement of changes in velocity of motion for the one or more objects. The frame may include a video image having a visual beat. Shifting the frame may include altering a display time period for a video image having a visual beat.

In some implementations, a given video image may include a subject having one or more points of distinct visual interest. In some implementations, a given object in motion may include one or more individuals dancing or otherwise moving through a visual scene captured in the user-generated video content. In some implementations, a given point of interest may include identifiable components of the object moving independently from other points of interest. In some implementations, re-timing the sequence may include retiming the sequence of video images using visual beats identified in the input video.

In some implementations, computing platform(s) 502, remote platform(s) 504, and/or external resources 532 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 532 may be operatively linked via some other communication media.

A given remote platform 504 may include one or more processors configured to execute computer program modules. The computer program modules may be configured to enable an expert or user associated with the given remote platform 504 to interface with system 500 and/or external resources 532, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 532 may include sources of information outside of system 500, external entities participating with system 500, and/or other resources. In some implementations, some or all of the functionality attributed herein to external resources 532 may be provided by resources included in system 500.

Computing platform(s) 502 may include electronic storage 534, one or more processors 536, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 534 may comprise non-transitory storage media that electronically stores information. The electronic storage media of electronic storage 534 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 534 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 534 may include one or more virtual storage resources (e.g., cloud storage, a virtual private network, and/or other virtual storage resources). Electronic storage 534 may store software algorithms, information determined by processor(s) 536, information received from computing platform(s) 502, information received from remote platform(s) 504, and/or other information that enables computing platform(s) 502 to function as described herein.

Processor(s) 536 may be configured to provide information processing capabilities in computing platform(s) 502. As such, processor(s) 536 may include one or more of a digital processor, an analog processor, a digital circuit designed to process information, an analog circuit designed to process information, a state machine, and/or other mechanisms for electronically processing information. Although processor(s) 536 is shown in FIG. 5 as a single entity, this is for illustrative purposes only. In some implementations, processor(s) 536 may include a plurality of processing units. These processing units may be physically located within the same device, or processor(s) 536 may represent processing functionality of a plurality of devices operating in coordination. Processor(s) 536 may be configured to execute modules 508, 510, 512, 514, 516, 518, 520, 522, 524, 526, 528, and/or 530, and/or other modules. Processor(s) 536 may be configured to execute modules 508, 510, 512, 514, 516, 518, 520, 522, 524, 526, 528, and/or 530, and/or other modules by software, hardware, firmware, some combination of software, hardware, and/or firmware, and/or other mechanisms for configuring processing capabilities on processor(s) 536. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, 522, 524, 526, 528, and/or 530 are illustrated in FIG. 5 as being implemented within a single processing unit, in implementations in which processor(s) 536 includes multiple processing units, one or more of modules 508, 510, 512, 514, 516, 518, 520, 522, 524, 526, 528, and/or 530 may be implemented remotely from the other modules. The description of the functionality provided by the different modules 508, 510, 512, 514, 516, 518, 520, 522, 524, 526, 528, and/or 530 described below is for illustrative purposes, and is not intended to be limiting, as any of modules 508, 510, 512, 514, 516, 518, 520, 522, 524, 526, 528, and/or 530 may provide more or less functionality than is described. For example, one or more of modules 508, 510, 512, 514, 516, 518, 520, 522, 524, 526, 528, and/or 530 may be eliminated, and some or all of its functionality may be provided by other ones of modules 508, 510, 512, 514, 516, 518, 520, 522, 524, 526, 528, and/or 530. As another example, processor(s) 536 may be configured to execute one or more additional modules that may perform some or all of the functionality attributed below to one of modules 508, 510, 512, 514, 516, 518, 520, 522, 524, 526, 528, and/or 530.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, (e.g., if the privacy settings for the object allow it to be surfaced to, discovered by, or otherwise visible to the querying user). In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user, and require the user to provide verification that access should be allowed before proceeding.

The techniques described herein may be implemented as method(s) that are performed by physical computing device(s); as one or more non-transitory computer-readable storage media storing instructions which, when executed by a computing device(s), cause the performance of the method(s); or, as a physical computing device(s) that are specially configured with a combination of hardware and software that causes performance of the method(s).

Figure 6:
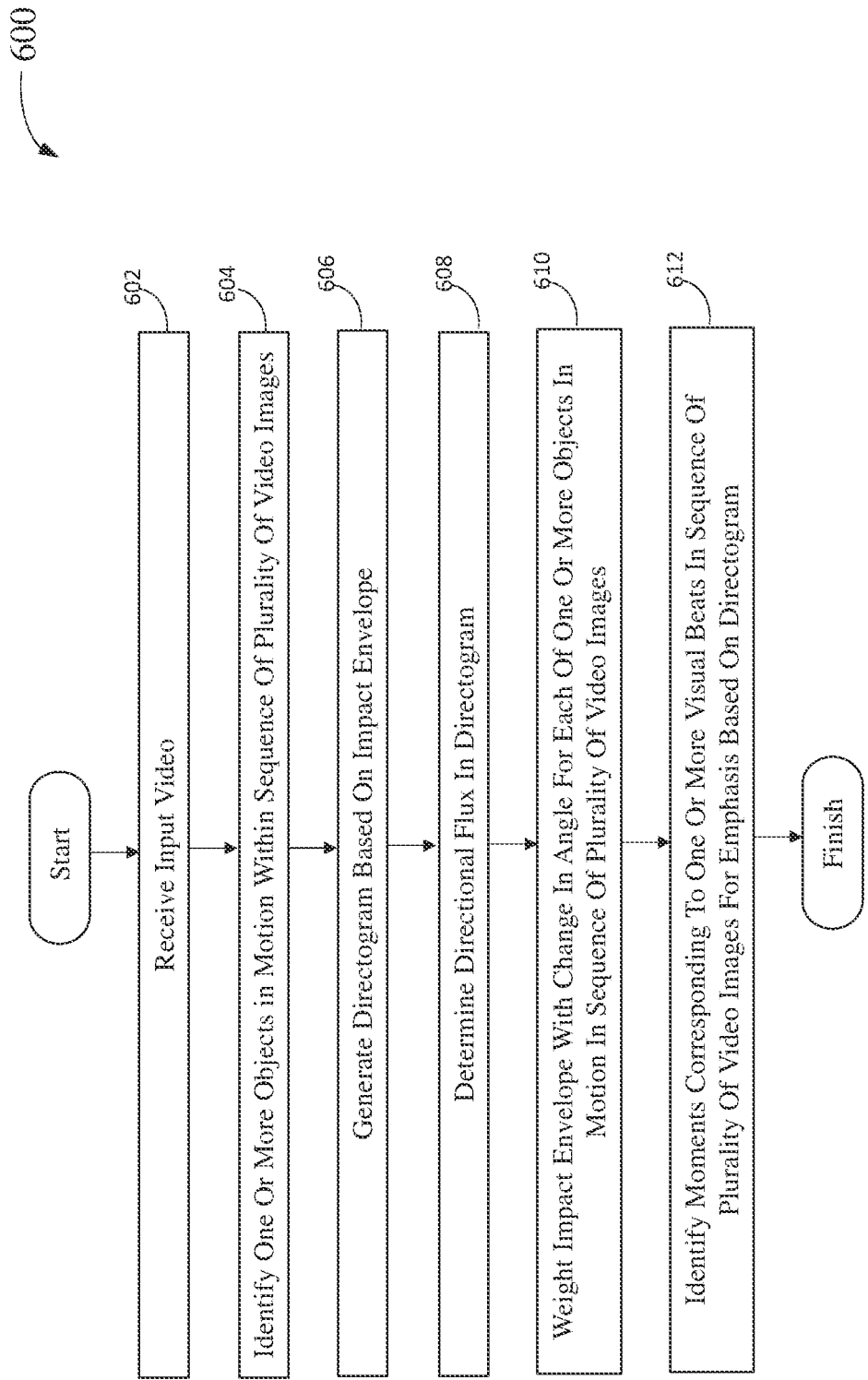
FIG. 6 illustrates an example flow diagram for generating visual beats, according to certain aspects of the disclosure.

FIG. 6 illustrates an example flow diagram (e.g., process 600) for generating visual beats, according to certain aspects of the disclosure. For explanatory purposes, the example process 600 is described herein with reference to FIGS. 1-5. Further, for explanatory purposes, the steps of the example process 600 are described herein as occurring in serial, or linearly. However, multiple instances of the example process 600 may occur in parallel. For purposes of explanation of the subject technology, the process 600 will be discussed in reference to FIGS. 1-5.

At step 602, process 600 may include receiving an input video. The input video may include a sequence of a plurality of video images, through input video receiving module 508. At step 604, process 600 may include identifying one or more objects in motion within the sequence of a plurality of video images, the one or more objects corresponding to one or more points of interest within the sequence of a plurality of video images. At step 606, process 600 may include generating a directogram based on the impact envelope. At step 610, process 600 may include weighting an impact envelope with a change in angle for each of the one or more objects in motion in the sequence of a plurality of video images. At step 612, the process 600 may include identifying moments corresponding to one or more visual beats in the sequence of a plurality of video images for emphasis based on the directogram.

For example, as described above in relation to FIG. 5, at step 602, the process 600 may include receiving an input video, through input video receiving module 508. The input video may include a sequence of a plurality of video images. At step 604, the process 600 may include identifying one or more objects in motion within the sequence of a plurality of video images, through object identifying module 510, the one or more objects corresponding to one or more points of interest within the sequence of a plurality of video images. At step 606, the process 600 may include generating a directogram based on the impact envelope, through directogram generating module 514. At step 608, the process may include determining a directional flux of the directogram, through at least the velocity measuring module 518. At step 610, the process 600 may include weighting an impact envelope with a change in angle for each of the one or more objects in motion in the sequence of a plurality of video images, through impact envelope weighting module 512. At step 612, the process 600 may include identifying moments corresponding to one or more visual beats in the sequence of a plurality of video images for emphasis based on the directogram, through moment identifying module 516.

According to an aspect, the input video is received from one or more of user generated video sources.

According to an aspect, the input video is received by uploading the input video from a user device.

According to an aspect, a given video image comprises a subject having one or more points of distinct visual interest.

According to an aspect, the sequence of the plurality of video images comprises the visual motion of the subject moving within the sequence of video images.

According to an aspect, the one or more objects include one or more of individuals showing one or more moving body parts.

According to an aspect, a given object in motion includes one or more individuals dancing.

According to an aspect, a given point of interest includes identifiable components of the object moving independently from other points of interest.

According to an aspect, the impact envelope includes an approximate measure of a detected occurrence of a visual beat within the sequence of a plurality of video images.

According to an aspect, the change in angle includes measurement of changes in the movement of points of interest.

Figure 7:
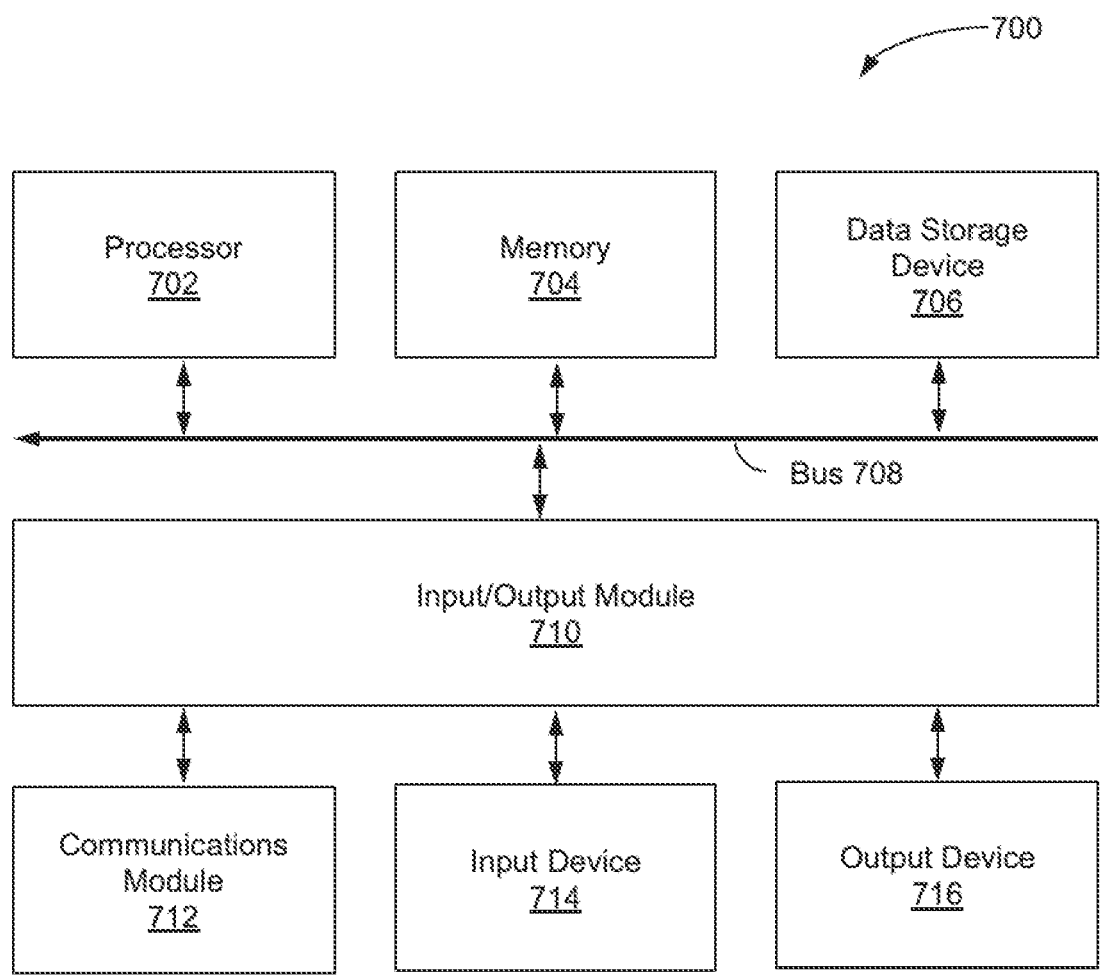
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question (e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device), coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, and XML-based languages. Memory 704 may also be used for storing temporary variables or other intermediate information during the execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device (e.g., a mouse or a trackball), by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback (e.g., visual feedback, auditory feedback, or tactile feedback), and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., such as a data server, or that includes a middleware component (e.g., an application server), or that includes a front-end component (e.g., a client computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set-top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require the selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for generating visual beats, comprising:
  receiving an input video, the input video comprising a sequence of a plurality of video images;

identifying an object in motion within the sequence of a plurality of video images, the object corresponding to a point of interest within the sequence of a plurality of video images;
weighting an impact envelope with a change in angle for the object in motion in the sequence of a plurality of video images;
generating a directogram based on the impact envelope;
identifying a moment corresponding to a visual beat associated with the object in a video image of the sequence of a plurality of video images for emphasis based on the directogram; and
altering, based on identifying the visual beat associated with the object in the video image, pixel values about the object in the video image.

2. The method of claim 1, wherein the input video is received from one or more of user generated video sources.

3. The method of claim 1, wherein the input video is received by uploading the input video from a user device.

4. The method of claim 1, wherein a given video image comprises a subject having one or more points of distinct visual interest.

5. The method of claim 4, wherein the sequence of the plurality of video images comprises visual motion of the subject moving within the sequence of video images.

6. The method of claim 1, wherein the object includes an individual showing one or more moving body parts.

7. The method of claim 1, wherein the object in motion includes an individual dancing.

8. The method of claim 1, wherein the point of interest includes identifiable components of the object moving independently from other points of interest.

9. The method of claim 1, wherein the impact envelope includes an approximate measure of a detected occurrence of a visual beat within the sequence of a plurality of video images.

10. The method of claim 1, wherein the change in angle includes measurement of changes in movement of points of interest, and wherein the method further comprises measuring a velocity of an angular bin for each video image in the sequence of the plurality of video images.

11. A system configured for generating visual beats, the system comprising:
one or more hardware processors configured by machine-readable instructions to:
receive an input video, the input video comprising a sequence of a plurality of video images, and the input video is uploaded from one or more of user-generated video sources;
identify an object in motion within the sequence of a plurality of video images, the object corresponding to a point of interest within the sequence of a plurality of video images;
weight an impact envelope with a change in angle for the object in motion in the sequence of a plurality of video images;
generate a directogram based on the impact envelope;
identify a moment corresponding to a visual beat associated with the object in a video image of the sequence of a plurality of video images for emphasis based on the directogram; and
alter, based on identifying the visual beat associated with the object in the video image, pixel values about the object in the video image.

12. The system of claim 11, wherein the input video is received from one or more of user generated video sources.

13. The system of claim 11, wherein the input video is received by uploading the input video from a user device.

14. The system of claim 11, wherein a given video image comprises a subject having one or more points of distinct visual interest.

15. The system of claim 14, wherein the sequence of the plurality of video images comprises visual motion of the subject moving within the sequence of video images.

16. The system of claim 11, wherein the object includes an individual showing one or more moving body parts.

17. The system of claim 11, wherein the object in motion includes an individual dancing.

18. The system of claim 11, wherein a point of interest includes identifiable components of the object moving independently from other points of interest.

19. The system of claim 11, wherein the impact envelope includes an approximate measure of a detected occurrence of a visual beat within the sequence of a plurality of video images; and wherein the change in angle includes measurement of changes in movement of points of interest.

20. A non-transient computer-readable storage medium having instructions embodied thereon, the instructions being executable by one or more processors to perform a method for generating visual beats, the method comprising:
receiving an input video, the input video comprising a sequence of a plurality of video images, and the input video is received from one or more of user generated video sources;
identifying an object in motion within the sequence of a plurality of video images, the object corresponding to a point of interest within the sequence of a plurality of video images, and the sequence of the plurality of video images comprises visual motion of a subject moving within the sequence of video images;
weighting an impact envelope with a change in angle for the object in motion in the sequence of a plurality of video images;
generating a directogram based on the impact envelope;
identifying a moment corresponding to a visual beat associated with the object in a video image of the sequence of a plurality of video images for emphasis based on the directogram; and
altering, based on identifying the visual beat associated with the object in the video image, pixel values about the object in the video image.

* * * * *